(12) United States Patent
Juan et al.

(10) Patent No.: US 11,232,681 B2
(45) Date of Patent: Jan. 25, 2022

(54) SYSTEM AND METHOD OF STATISTICALLY COMPARING SPORTS-ENTITIES

(71) Applicants: Juan Juan, Roseville, CA (US); Chris Longboy, San Jose, CA (US)

(72) Inventors: Juan Juan, Roseville, CA (US); Chris Longboy, San Jose, CA (US)

(73) Assignee: FANALYZE, INC., San Jose, CA (US)

( * ) Notice: Subject to any disclaimer, the term of this patent is extended or adjusted under 35 U.S.C. 154(b) by 166 days.

(21) Appl. No.: 16/858,508

(22) Filed: Apr. 24, 2020

(65) Prior Publication Data

US 2020/0342718 A1 Oct. 29, 2020

Related U.S. Application Data

(60) Provisional application No. 62/838,178, filed on Apr. 24, 2019.

(51) Int. Cl.
| | |
|---|---|
| *G07F 17/32* | (2006.01) |
| *G06F 16/332* | (2019.01) |
| *G06F 16/335* | (2019.01) |
| *G06Q 50/00* | (2012.01) |
| *G06Q 50/34* | (2012.01) |

(52) U.S. Cl.
CPC ........ *G07F 17/3288* (2013.01); *G06F 16/335* (2019.01); *G06F 16/3328* (2019.01); *G06Q 50/01* (2013.01); *G06Q 50/34* (2013.01)

(58) Field of Classification Search
CPC ............. G07F 17/3288; G07F 17/3234; G07F 17/3237; G07F 17/3274; G07F 17/3276; G07F 17/3223; G07F 17/3225; G07F 17/3255; G07F 17/3272; G06F 16/3328; G06F 16/335; G06Q 50/01; G06Q 50/34; A63F 2300/8005; A63F 2300/8011; A63F 2300/8052
USPC ..................................................... 700/90–93
See application file for complete search history.

(56) References Cited

U.S. PATENT DOCUMENTS

| | | | | |
|---|---|---|---|---|
| 4,918,603 A | * | 4/1990 | Hughes .................. | G09B 19/00 463/4 |
| 5,593,349 A | * | 1/1997 | Miguel ...................... | F41J 3/00 463/30 |

(Continued)

*Primary Examiner* — David L Lewis
*Assistant Examiner* — Matthew D Hoel (57) ABSTRACT

A system and method of statistically comparing sports-entities provides real-time data for better informed sporting bets. The system includes at least one remote server and a plurality of personal computing (PC) devices. A plurality of user accounts and at least one real-time sport database are managed by the remote server. The method begins by prompting each user account to enter a sports-entity search query with a corresponding PC device. The sport-entity search query is relayed from the corresponding PC device to the remote server. The sports-entity search query is then compared to the identification information of each sports-entity profile in order to identify a matching profile from the plurality of sports-entity profiles. A plurality of iterations is executed in order to identify a plurality of matching profiles. Information for each matching profile is compiled into a graphical comparison, and the graphical comparison is outputted with the PC device.

13 Claims, 13 Drawing Sheets

(56) References Cited

U.S. PATENT DOCUMENTS

| | | | | |
|---|---|---|---|---|
| 5,769,714 A * | 6/1998 | Wiener | A63F 13/005 | 463/3 |
| 5,819,457 A * | 10/1998 | Parker | G09F 23/00 | 40/657 |
| 5,846,132 A * | 12/1998 | Junkin | A63F 3/081 | 463/42 |
| 6,371,855 B1 * | 4/2002 | Gavriloff | A63F 13/12 | 463/42 |
| 6,669,565 B2 * | 12/2003 | Liegey | A63F 3/081 | 463/1 |
| 7,001,279 B1 * | 2/2006 | Barber | H04N 21/4781 | 463/42 |
| 7,351,150 B2 * | 4/2008 | Sanchez | A63F 13/86 | 463/42 |
| 7,548,242 B1 * | 6/2009 | Hughes | A63F 13/35 | 345/473 |
| 7,614,944 B1 * | 11/2009 | Hughes | A63F 13/12 | 463/4 |
| 7,988,560 B1 * | 8/2011 | Heller | A63F 9/24 | 463/42 |
| 8,176,518 B1 * | 5/2012 | Junkin | A63F 13/63 | 725/61 |
| 8,340,794 B1 * | 12/2012 | Trdinich | A63F 13/46 | 700/91 |
| 8,366,551 B2 * | 2/2013 | Thomas | A63F 13/828 | 463/42 |
| 8,449,361 B2 * | 5/2013 | Laycock | A63F 13/46 | 463/9 |
| 8,460,078 B2 * | 6/2013 | Moore | G07F 17/3237 | 463/9 |
| 8,509,929 B1 * | 8/2013 | Hughes | A63F 13/828 | 700/91 |
| 8,538,563 B1 * | 9/2013 | Barber | G07F 17/3288 | 700/91 |
| 8,606,380 B2 * | 12/2013 | Trdinich | A63F 13/828 | 700/92 |
| 8,622,797 B2 * | 1/2014 | Noonan | A63F 13/828 | 463/9 |
| 8,670,847 B2 * | 3/2014 | Sloan | A63F 13/65 | 700/91 |
| 8,851,998 B2 * | 10/2014 | Pawson | A63F 13/828 | 463/42 |
| 8,888,584 B2 * | 11/2014 | Cohen | A63F 13/828 | 463/25 |
| 9,358,462 B2 * | 6/2016 | Hughes | A63F 13/12 | |
| 9,474,960 B1 * | 10/2016 | Lundschen | A63F 13/30 | |
| 9,731,193 B2 * | 8/2017 | Hughes | A63F 13/828 | |
| 10,029,183 B2 * | 7/2018 | Lundschen | A63F 13/30 | |
| 10,046,243 B2 * | 8/2018 | Arnone | A63F 13/828 | |
| 10,105,595 B2 * | 10/2018 | Lempel | A63F 13/828 | |
| 10,391,389 B2 * | 8/2019 | Hughes | A63F 13/828 | |
| 10,424,164 B2 * | 9/2019 | Kehoe | G07F 17/3204 | |
| 10,861,289 B1 * | 12/2020 | Gordon | A63F 13/35 | |
| 11,037,400 B2 * | 6/2021 | Cohen | G07F 17/3237 | |
| 11,040,274 B2 * | 6/2021 | Hughes | A63F 13/828 | |
| 2002/0107073 A1 * | 8/2002 | Binney | A63F 13/828 | 463/42 |
| 2003/0054885 A1 * | 3/2003 | Pinto | A63F 13/79 | 463/42 |
| 2004/0110552 A1 * | 6/2004 | Del Prado | A63F 13/795 | 463/4 |
| 2005/0159220 A1 * | 7/2005 | Wilson | A63F 13/424 | 463/40 |
| 2006/0040719 A1 * | 2/2006 | Plimi | G07F 17/32 | 463/9 |
| 2006/0064184 A1 * | 3/2006 | Ream | G07F 17/3262 | 700/91 |
| 2006/0183547 A1 * | 8/2006 | McMonigle | G07F 17/32 | 463/40 |
| 2006/0252476 A1 * | 11/2006 | Bahou | A63F 13/12 | 463/4 |
| 2007/0060380 A1 * | 3/2007 | McMonigle | G07F 17/32 | 463/42 |
| 2012/0231890 A1 * | 9/2012 | Junkin | H04N 21/4781 | 463/42 |
| 2013/0303291 A1 * | 11/2013 | Hughes | A63F 13/828 | 463/42 |
| 2016/0339344 A1 * | 11/2016 | Hughes | A63F 13/12 | |
| 2017/0361214 A1 * | 12/2017 | Hughes | A63F 13/828 | |
| 2019/0336851 A1 * | 11/2019 | Hughes | A63F 13/20 | |
| 2021/0339120 A1 * | 11/2021 | Hughes | A63F 13/20 | |

* cited by examiner

SYSTEM AND METHOD OF STATISTICALLY COMPARING SPORTS-ENTITIES

The current application claims a priority to the U.S. provisional patent application Ser. No. 62/838,178 filed on Apr. 24, 2019.

FIELD OF THE INVENTION

The present invention generally relates to sporting events. More specifically, the present invention facilitates the access and analysis of statistics for players and teams by statistically comparing sports-entities.

BACKGROUND OF THE INVENTION

Sports gambling is a growing industry that requires up-to-date information and fast analysis. Without real-time updates regarding players and teams, individuals can easily make bad bets and lose a significant amount of money. Receiving information from a single source is simply not enough to ensure a safe bet has been made.

The present invention provides a user with quick access to real-time information for a variety of players and a variety of teams. The present invention provides analysis that accounts for a variety of factors that reflect a change in the performance of a player or team. The present invention facilitates the comparison of players and the comparison of teams by allowing a user to easily search multiple players and multiple teams, simultaneously. The present invention not only accounts for real sporting events but fantasy leagues as well.

DETAIL DESCRIPTIONS OF THE INVENTION

All illustrations of the drawings are for the purpose of describing selected versions of the present invention and are not intended to limit the scope of the present invention.

Figure 1:
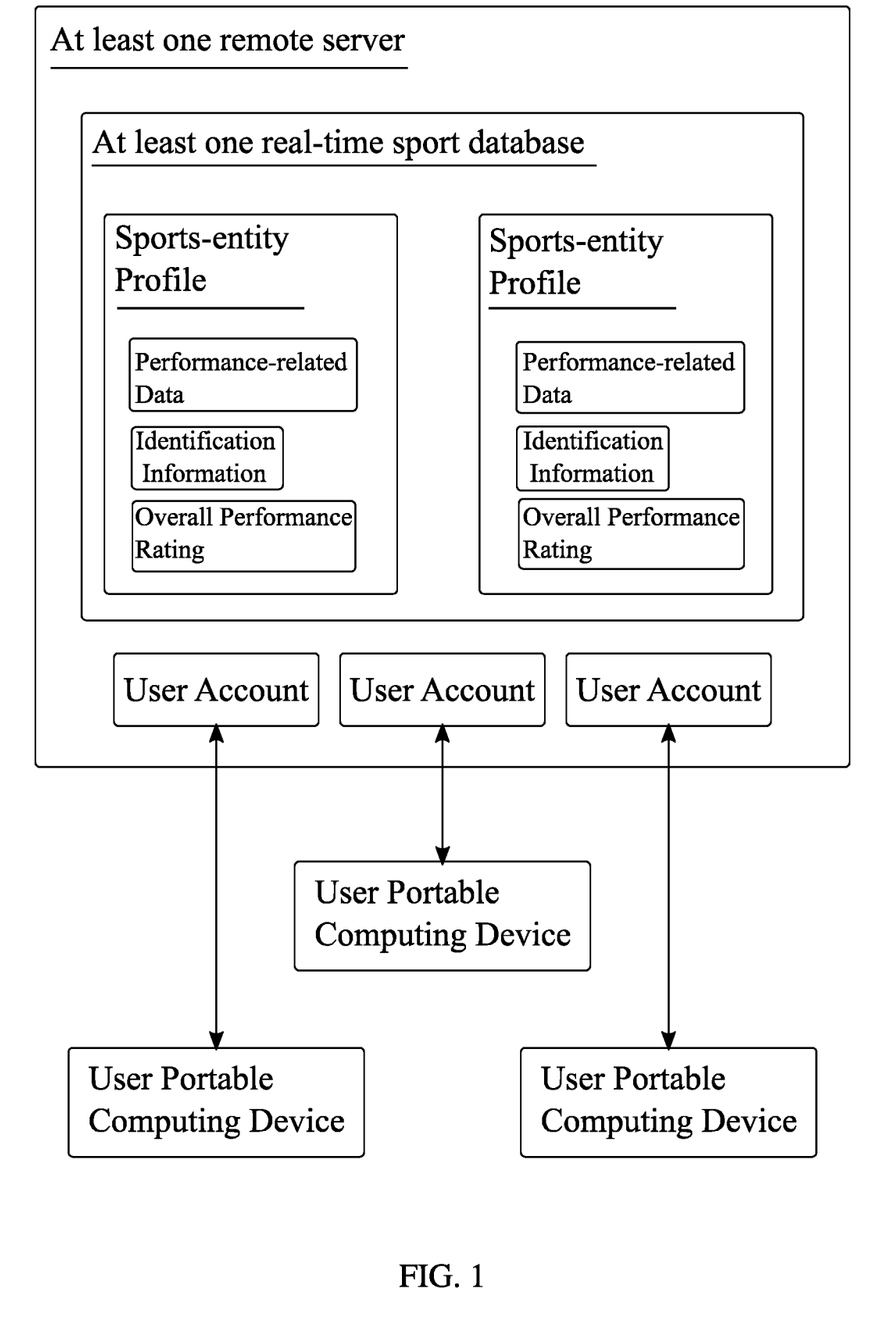
FIG. 1 is a system diagram a method of the present invention.

The present invention is a system and method of statistically comparing sports-entities. The present invention provides real-time data for improved betting chances on those sports-entities. The present invention provides the necessary statistics, news reports, and analysis that allows a user to make an educated bet in both fantasy leagues and real sports leagues. Thus, the physical system used to implement the method for the present invention includes at least one remote server and a plurality of personal computing (PC) devices, as seen in FIG. 1. A plurality of user accounts is managed by the at least one remote server, wherein each user account is associated with a corresponding user PC device (Step A). The plurality of user accounts allows access to the present invention for users including, but not limited to, a sports fan, a trainer or employee of a player or sports team, and a sports agent. Another kind of account specified for a sports professional may input verification data that differentiates the identity of one user account from the identity of another user account. Any data associated with the plurality of user accounts is stored on the at least one remote server. The corresponding PC device may be, but is not limited to, a computerized mobile phone (i.e. a "smartwatch"), a laptop, a tablet PC, a desktop, or a computerized watch (i.e. a "smartwatch"). At least one real-time sport database is managed by the remote server as well (Step B). The real-time sport database stores and is regularly updated with scores and statistics of individual players and sports teams of varying types of sports. The real-time sport database includes a plurality of sports-entity profiles in order to distinguish between each player and each sports team. Each sports-entity profile includes identification information, performance-related data, and an overall performance rating. The identification information provides a name, associated player number or player numbers, associated player position or player positions, and so on. The performance-related data provides statistics, titles, awards, and so on. The overall performance rating is a derived rating that summarizes the performance-related data and a variety of other influencing factors such as reviews and relevant events. Moreover, the performance-related data includes fantasy-sports-related data and real-sports-related data. The fantasy-sports-related data provides relevant statistics for fantasy sports leagues. The real-sports-related data provides relevant statistics for real games and sporting events.

Figure 2:
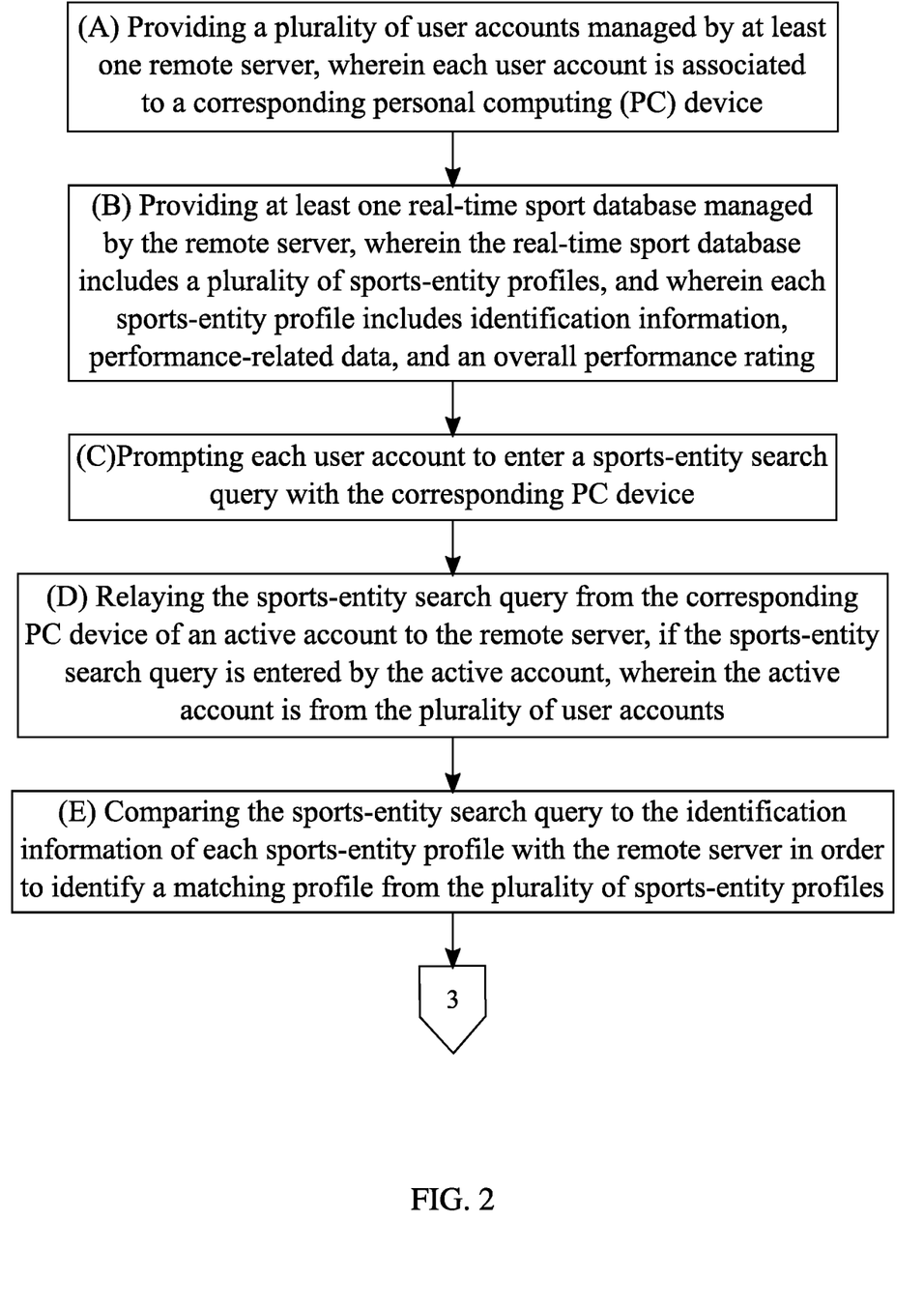
FIG. 2 is a flowchart illustrating the overall process for the method of the present invention.
Figure 3:
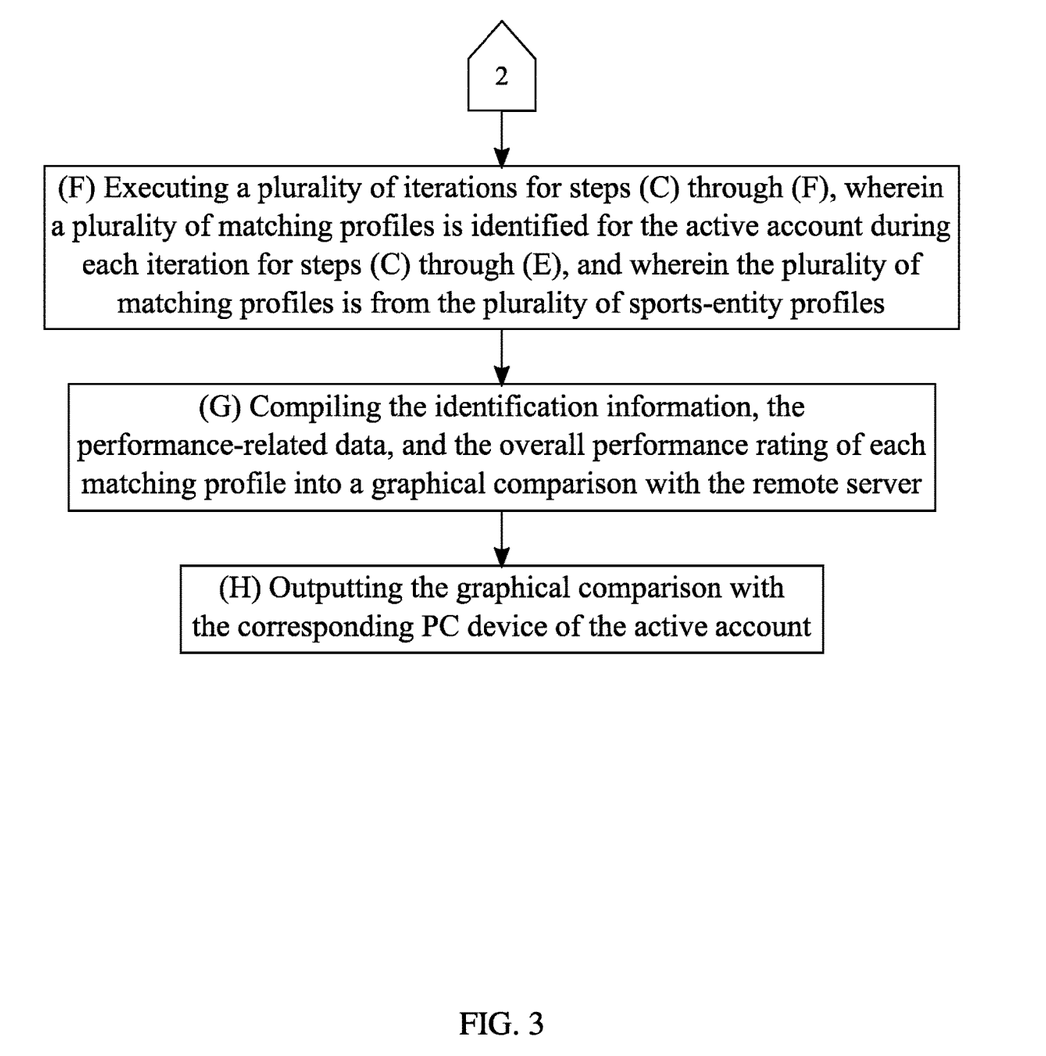
FIG. 3 is a flowchart illustrating a continuation of the flowchart in FIG. 2.
Figure 8:
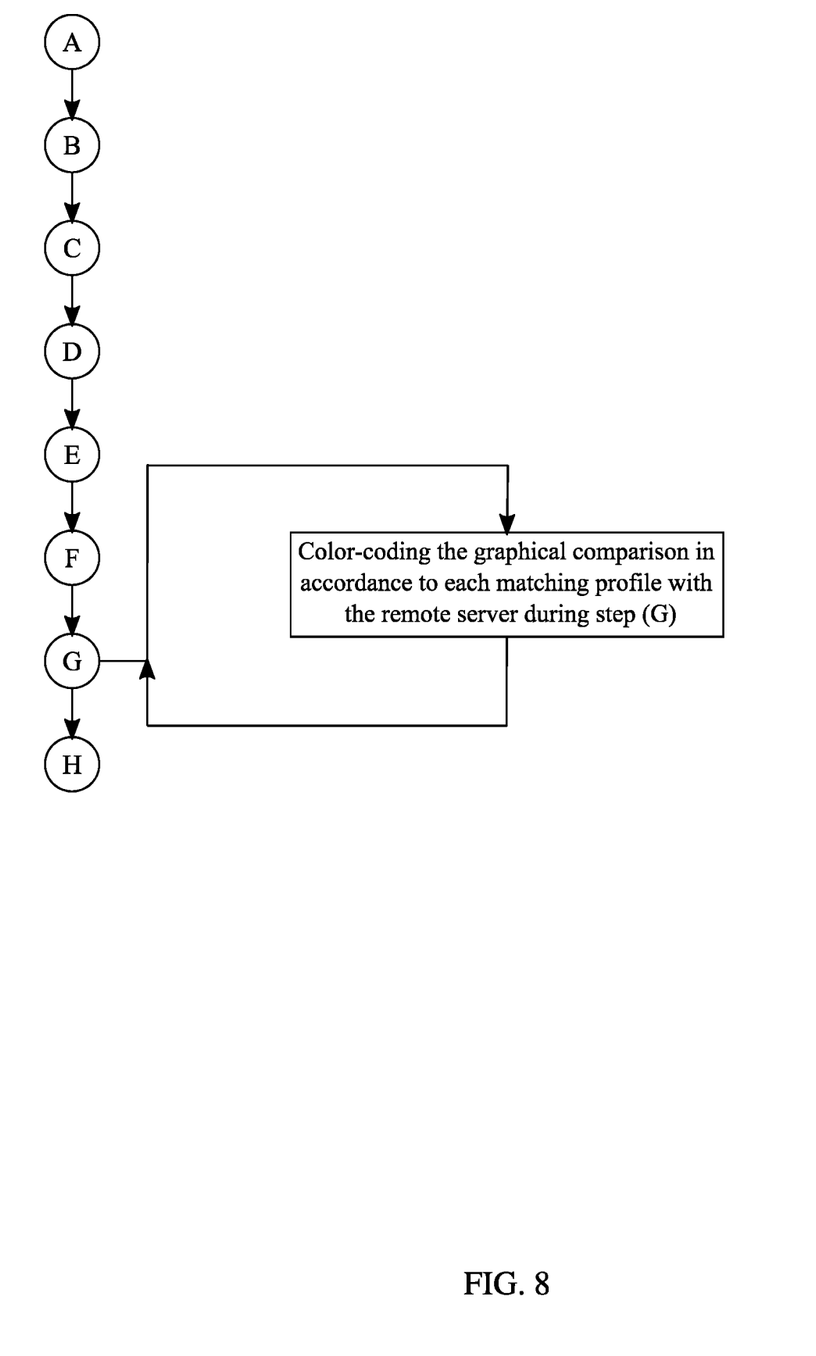
FIG. 8 is a flowchart illustrating the subprocess for visually differentiating each matching profile in a graphical comparison.

The overall process for the method of the present invention includes the following steps that are implemented with the at least one remote server and the plurality of PC devices. The overall process begins by prompting each user account to enter a sports-entity search query with the corresponding PC device (Step C), as seen in FIG. 2. The sports-entity search query is at least one keyword, such as a name, that is associated with a desired sports-entity profile. In order to identify the desired sports-entity profile, the sports-entity search query is relayed from the corresponding PC device of an active account to the remote server, if the sports-entity search query is entered by the active account, wherein the active account is from the plurality of user accounts (Step D). The sports-entity search query is compared to the identification information of each sports-entity profile with the remote server in order to identify a matching profile from the plurality of sports-entity profiles (Step E). The matching profile presents the desired player or team among the plurality of spots-entity profiles that may be relevant to the sports-entity search query. Multiple sport-entity profiles may be compared to each other by executing a plurality of iterations for Step C through Step E, wherein a plurality of matching profiles is identified for the active account during each iteration for Step C through Step E. The plurality of matching profiles includes each sports-entity profile that a user wishes to compare with each other. Moreover, the plurality of matching profiles is from the plurality of sports-entity profiles (Step F), as seen in FIG. 3. The user is able to easily compare the plurality of matching profiles as the identification information, the performance-related data, and the overall performance rating of each matching profile is compiled into a graphical comparison with the remote server (Step G). In order to distinguish between multiple teams and players, the graphical comparison is color-coded in accordance to each matching profile with the remote server during Step G, seen in FIG. 8. More specifically, the graphical comparison includes at least one graph and at least one comprehensive report. The graphical comparison is outputted with the corresponding PC device of the active account (Step H) for a user to view the graphical comparison.

Figure 4:
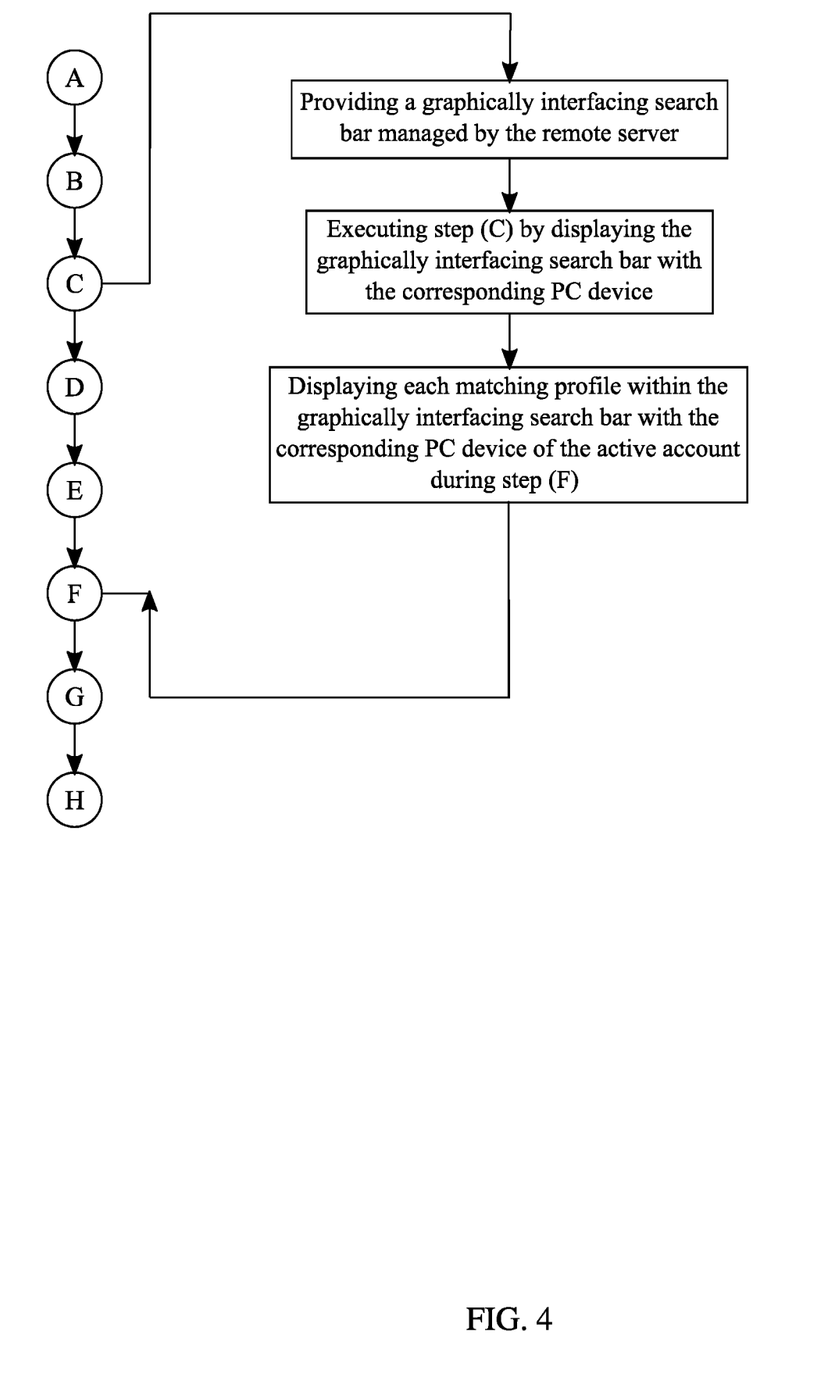
FIG. 4 is a flowchart illustrating the subprocess for utilizing a graphically interfacing search bar to display each matching profile.

The user is able to view and edit the multiple sport-entity profiles as a graphically interfacing search bar is provided and managed by the remote server, as seen in FIG. 4. The graphically interfacing search bar continuously presents each of the multiple sport-entity profiles in a search bar. In the preferred embodiment of the present invention, the keyword, such as the name of a player or a sports team, remains as a selection in the search bar with a delete button beside each selection. The delete button is preferably an "x" symbol to indicate the function of the delete button. In order for a user to view each sport-entity profile, Step C is executed by displaying the graphically interfacing search bar with the corresponding PC device. Each matching profile is displayed within the graphically interfacing search bar with the corresponding PC device of the active account during Step F, allowing a user to easily edit the combination of the multiple sport-entity profiles.

Figure 5:
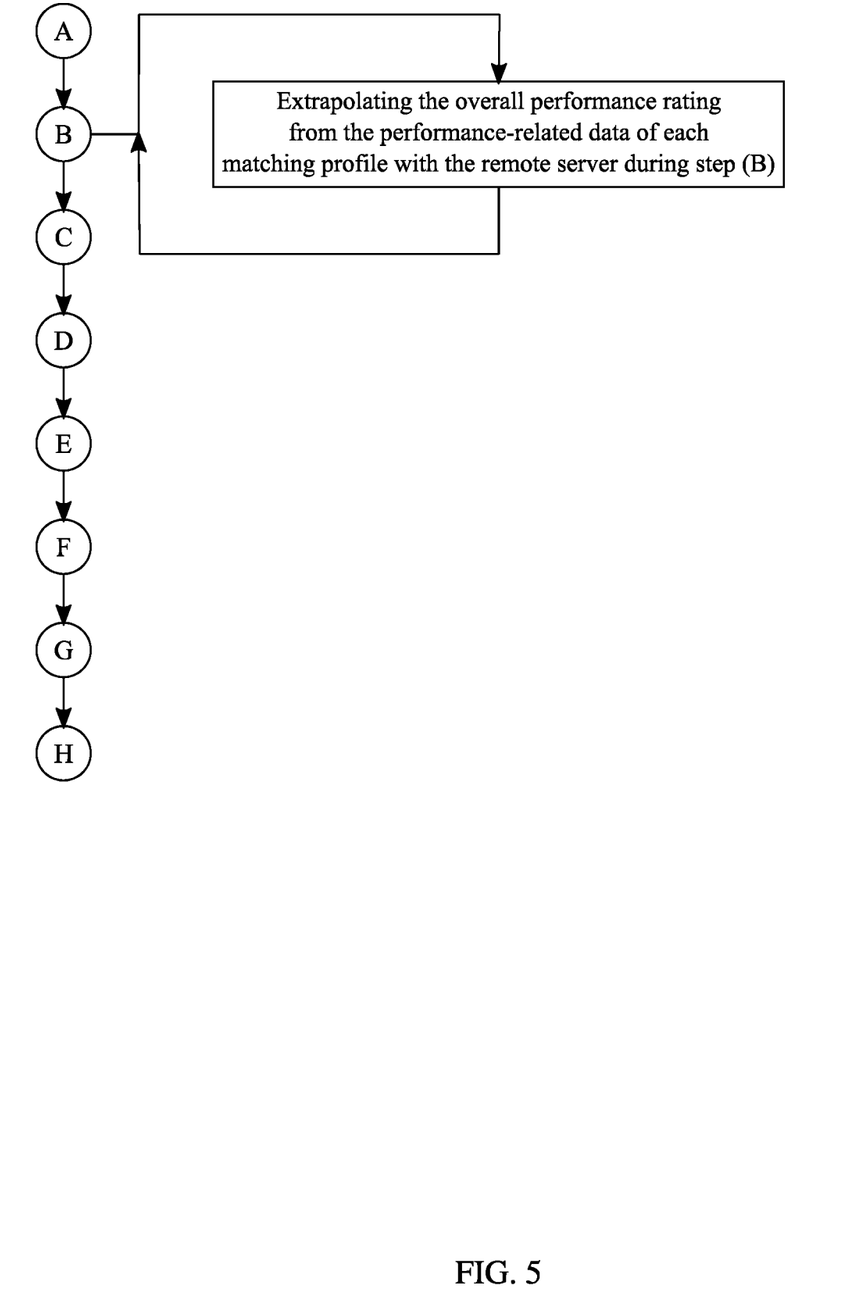
FIG. 5 is a flowchart illustrating the subprocess for accounting a performance-related data with an overall performance rating.
Figure 6:
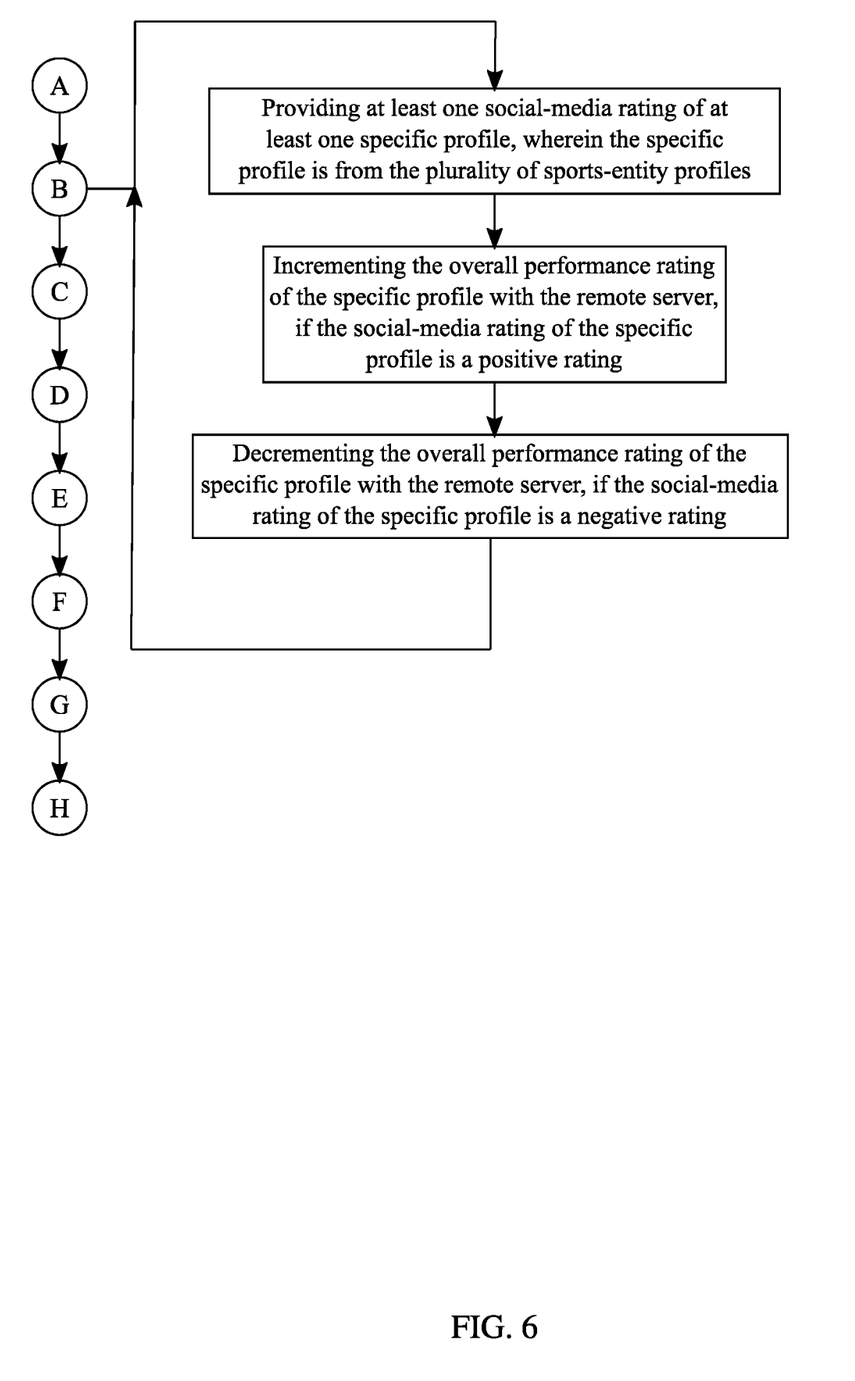
FIG. 6 is a flowchart illustrating the subprocess for adjusting the overall performance rating based on a social-media rating.

In order to see chances of each matching profile in a betting event, the overall performance rating is extrapolated from the performance-related data of each matching profile with the remote server during Step B, as seen in FIG. 5. The overall performance rating becomes more accurate as at least one social-media rating of at least one specific profile is provided, wherein the specific profile is from the plurality of sports-entity profiles, as seen in FIG. 6. The at least one social-media rating is a rating given to the specific profile in any piece of related news on social media platforms. The overall performance rating of the specific profile is incremented with the remote server, if the social-media rating of the specific profile is a positive rating. The positive rating may include good news relevant to the performance of the at least one specific profile in a game or sporting event such as increased or improved training. The overall performance rating of the specific profile is decremented with the remote server, if the social-media rating of the specific profile is a negative rating. The negative rating may include bad news relevant to the performance of the at least one specific profile in a game or sporting event such as minor injury.

Figure 7:
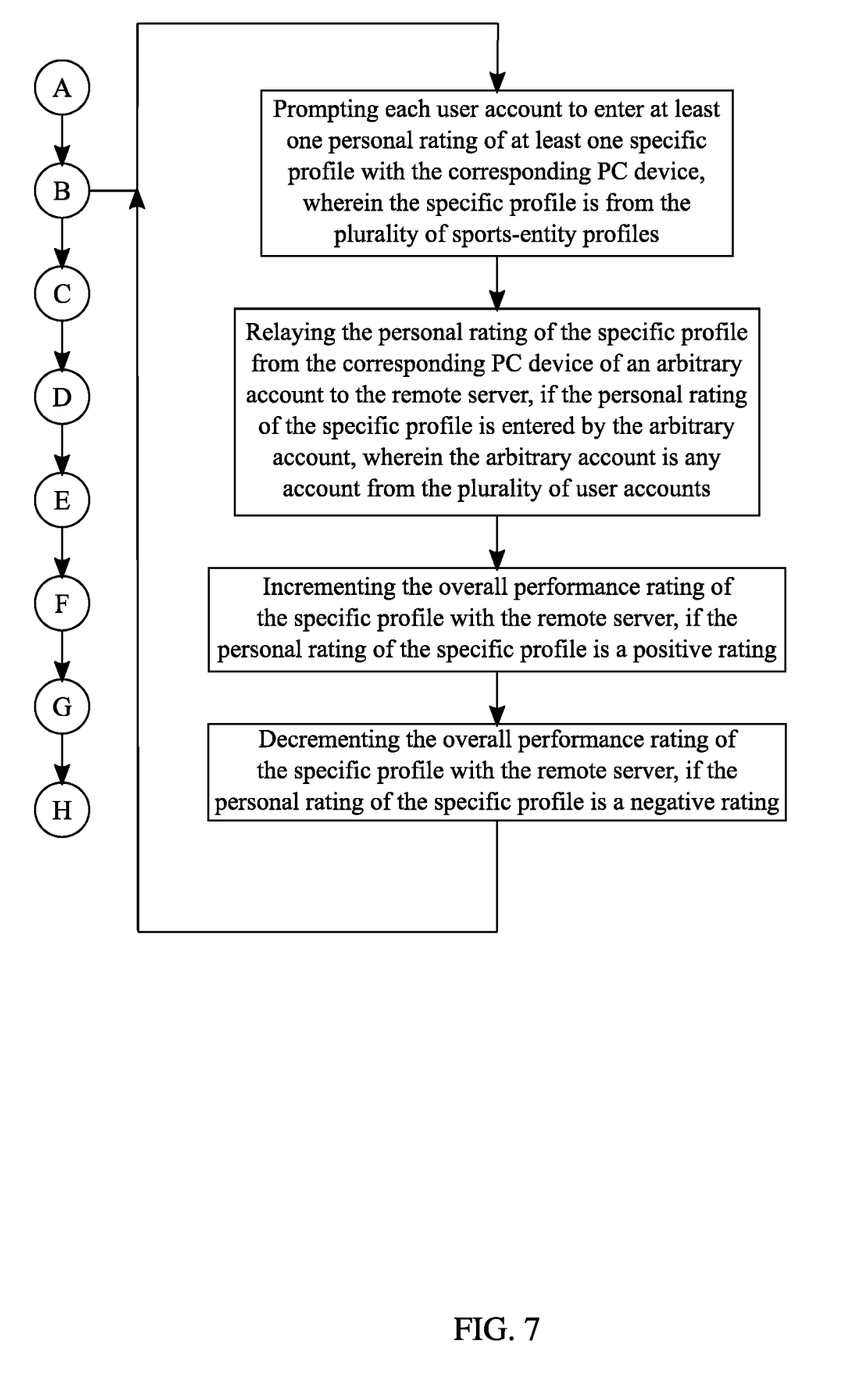
FIG. 7 is a flowchart illustrating the subprocess for adjusting the overall performance rating based on a personal rating.

In order to output an even more accurate overall performance rating for a specific profile, each user account is prompted to enter at least one personal rating of at least one specific profile with the corresponding PC device, as seen in FIG. 7. The at least one personal rating is a rating given to the specific profile by a user depending on the effect of the performance of the specific profile with a corresponding bet of the user. The at least one personal rating may also be a review that describes the performance of a sports-entity profile or any factors that may influence the performance of the sports-entity profile. The at least one personal rating may also be a survey as well. In the preferred embodiment of the present invention, each personal rating may influence the overall performance rating based on a professional status of the user account with respect to a sports-entity profile. For example, if the user account is the trainer for a team, the personal rating affects the overall performance rating for a sports-entity profile more than the personal rating of a user account that is simply a fan of the sport. The personal rating of the specific profile is relayed from the corresponding PC device of an arbitrary account to the remote server, if the personal rating of the specific profile is entered by the arbitrary account in order to include the at least one personal rating into the overall performance rating. The arbitrary account is any account from the plurality of user accounts. The overall performance rating is more accurate as the overall performance rating of the specific profile is incremented with the remote server, if the personal rating of the specific profile is a positive rating. The positive rating may be a score above a certain value, a review with a given amount of positive words, a survey score of a certain high percentage, and so on. Similarly, the overall performance rating of the specific profile is decremented with the remote server, if the personal rating of the specific profile is a negative rating. The negative rating may be a score below a certain value, a review with a given amount of negative words, a survey score of certain low percentage, and so on.

Figure 9:
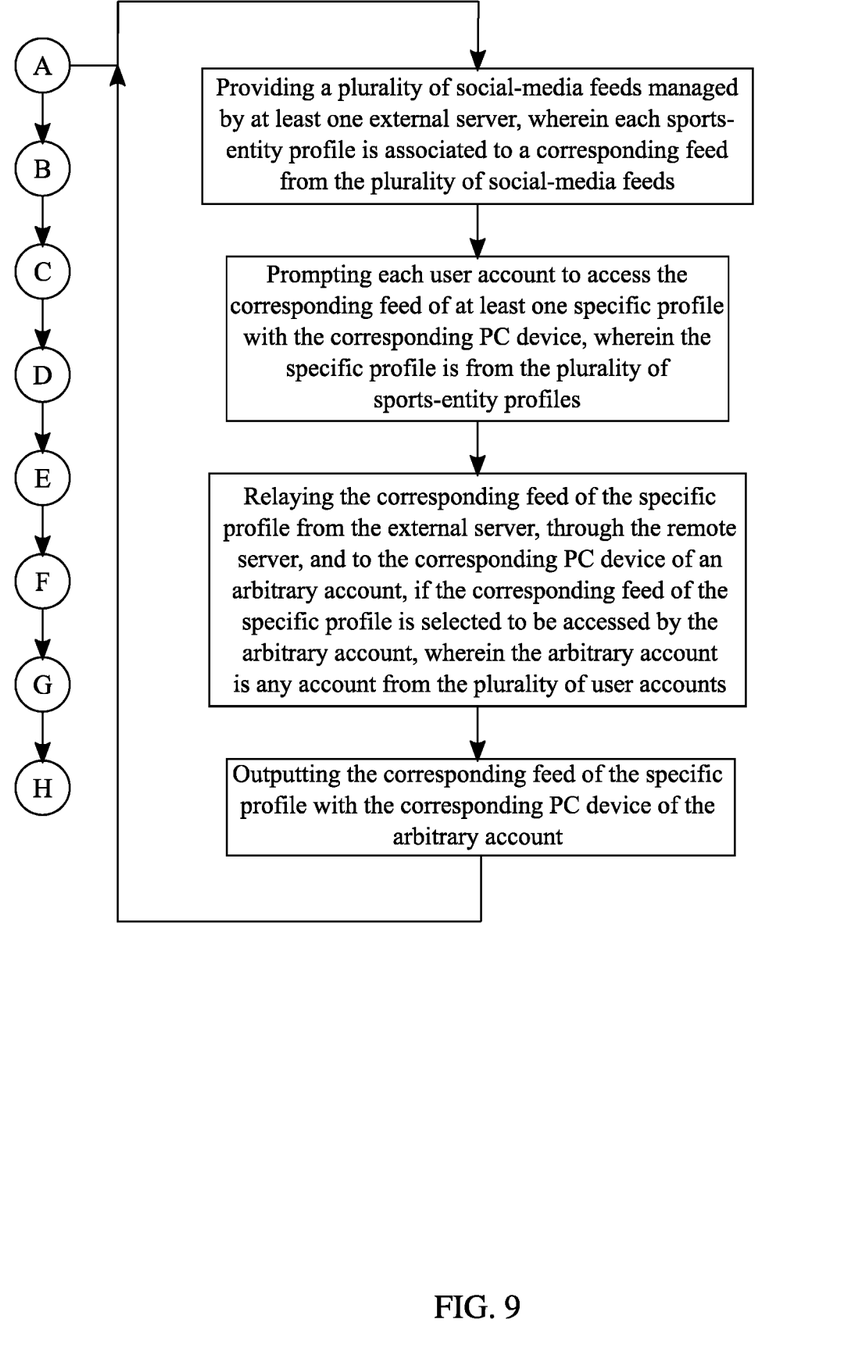
FIG. 9 is a flowchart illustrating the subprocess for outputting a corresponding social-media feed for a sports-entity profile.

A user is able to view current news relating to a desired sports-entity profile as a plurality of social-media feeds is provided and managed by at least one external server, wherein each sports-entity profile is associated to a corresponding feed from the plurality of social-media feeds, as seen in FIG. 9. The plurality of social-media feeds provides all links for various social media and news outlets with any keywords associated with the desired sports-entity profile. In order to identify a plurality of social-media feeds, each user account is prompted to access the corresponding feed of at least one specific profile with the corresponding PC device, wherein the specific profile is from the plurality of sports-entity profiles. The corresponding feed of the specific profile is then relayed from the external server, through the remote server, and to the corresponding PC device of an arbitrary account, if the corresponding feed of the specific profile is selected to be accessed by the arbitrary account, thereby presenting only the plurality of social-media feeds that is relevant for the user. The arbitrary account is any account from the plurality of user accounts. The corresponding feed of the specific profile is outputted with the corresponding PC device of the arbitrary account for the viewing of the user.

Figure 10:
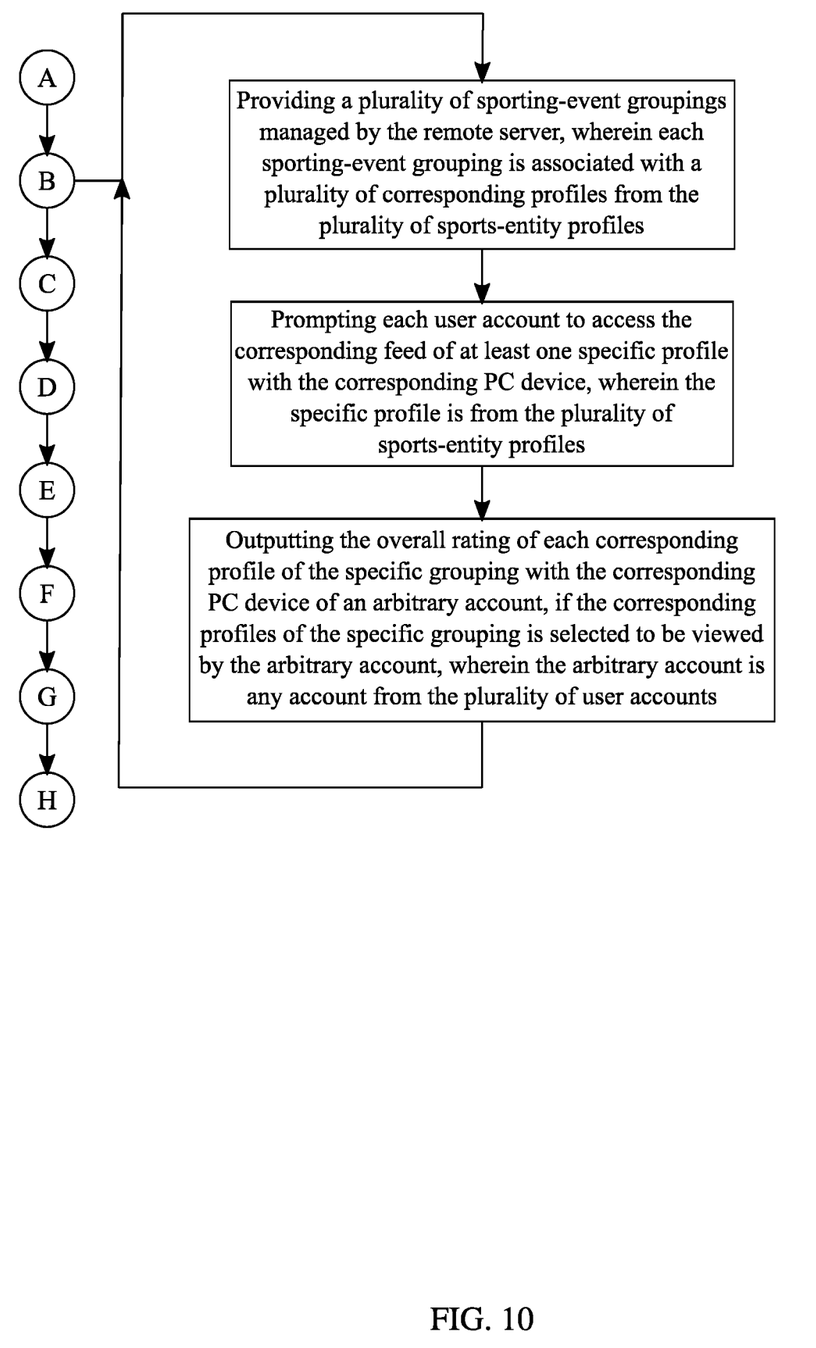
FIG. 10 is a flowchart illustrating the subprocess for outputting the overall performance rating for a plurality of sports-entity profiles associated with a specific sporting-event grouping.

A user is able to remain up-to-date with all sporting events, and consequently opportunities to bet for sporting events as a plurality of sporting-event groupings is provided and managed by the remote server, wherein each sporting-event is associated with a plurality of corresponding profiles from the plurality of sports-entity profiles. As seen in FIG.

10, the plurality of sporting-event groupings may include, but is not limited to, games, tournaments, competitions, and so on that are currently taking place and will take place. More specifically, the plurality of sporting-event groupings serves as a schedule for sporting events. Better informed bets may be made on a specific sporting event as each user account is prompted to view the corresponding profiles of at least one specific grouping with the corresponding PC device, wherein the specific grouping is from the plurality of sporting-event groupings. The overall performance rating of each corresponding profile of the specific grouping is outputted with the corresponding PC device of an arbitrary account, if the corresponding profiles of the specific grouping is selected to be viewed by the arbitrary account, so that the user is able to review and assess the overall performance rating for each profile for a better informed bet. Moreover, the arbitrary account is any account from the plurality of user accounts.

Figure 11:
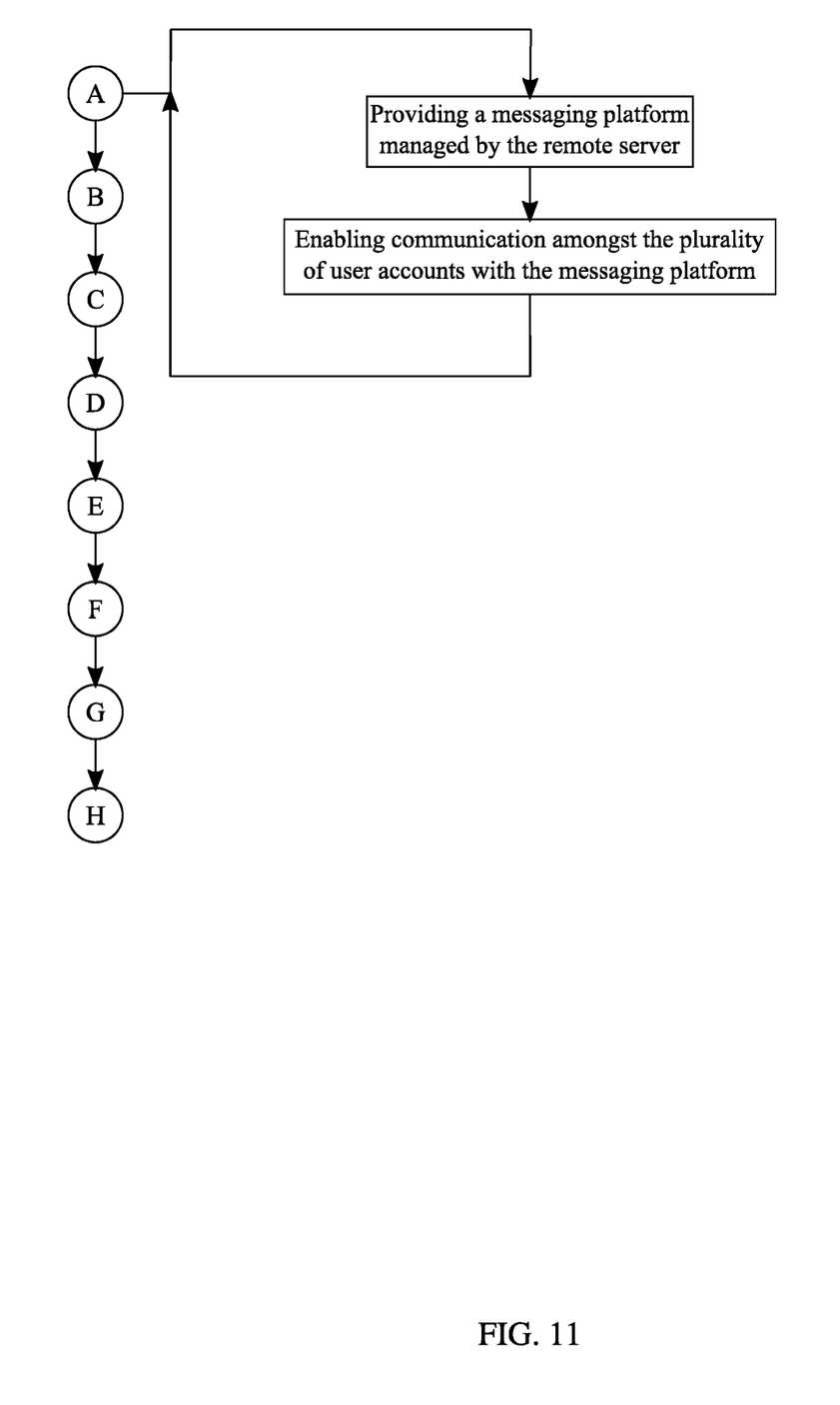
FIG. 11 is a flowchart illustrating the subprocess for enabling communication through a messaging platform for the plurality of user accounts.

The plurality of user accounts may communicate amongst each other in order to receive more information regarding a sports-entity profile from the plurality of sports-entity profiles through a messaging platform, as seen in FIG. 11. The messaging platform is managed by the remote server and allows the plurality of user accounts to deliver messages and share a sports-entity profile and, specifically, the overall performance rating of a sports-entity profile with each other. Communication is enabled amongst the plurality of user accounts with the messaging platform so that any information from the present invention is exchanged with the present invention.

Figure 12:
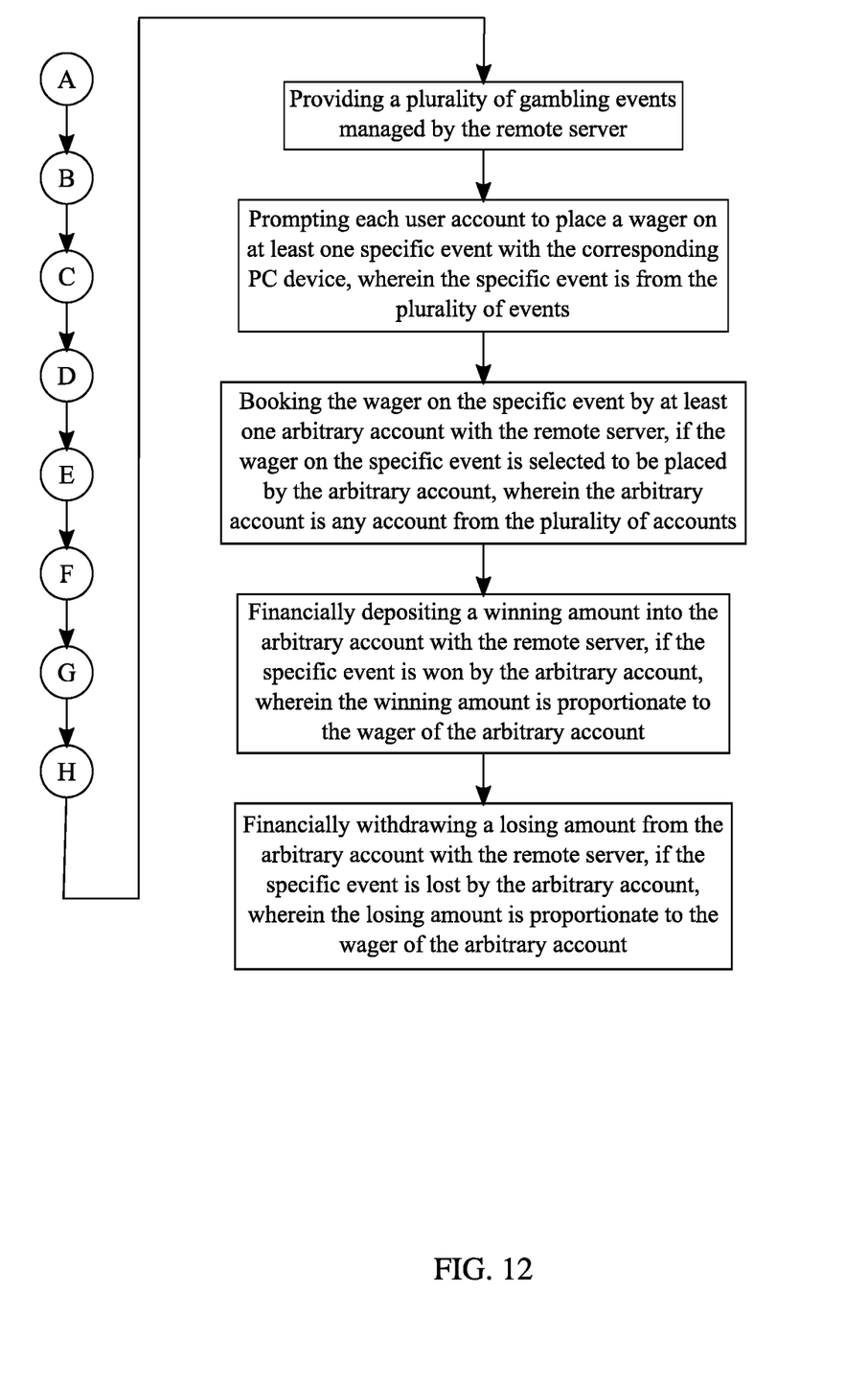
FIG. 12 is a flowchart illustrating the subprocess for booking a wager on a specific gambling event, wherein a plurality of gambling events is internally managed by a remote server.

The plurality of user accounts is also able to directly bet on any of the plurality of sports-entity profiles as a plurality of gambling events is provided and managed by the remote server, seen in FIG. 12. The plurality of gambling events serves as a schedule for any opportunity that a user may make a bet. In order to make a bet, each user account is prompted to place a wager on at least one specific event with the corresponding PC device, wherein the specific event is from the plurality of events. The wager is a designated monetary value that a user account assigns for an expected outcome of a sporting-entity profile or a sporting event. The wager on the specific event is booked by at least one arbitrary account with the remote server, if the wager on the specific event is selected to be placed by the arbitrary account, wherein the arbitrary account is any account from the plurality of accounts. The booking of the wager records and associates the wager with the specific event. The bet of the user is complete with a winning amount financially deposited into the arbitrary account with the remote server, if the specific event is won by the arbitrary account, wherein the winning amount is proportionate to the wager of the arbitrary account. Similarly, a losing amount is financially withdrawn from the arbitrary account with the remote server, if the specific event is lost by the arbitrary account, wherein the losing amount is proportionate to the wager of the arbitrary account. Each gambling event complete with the winning amount and the losing amount.

Figure 13:
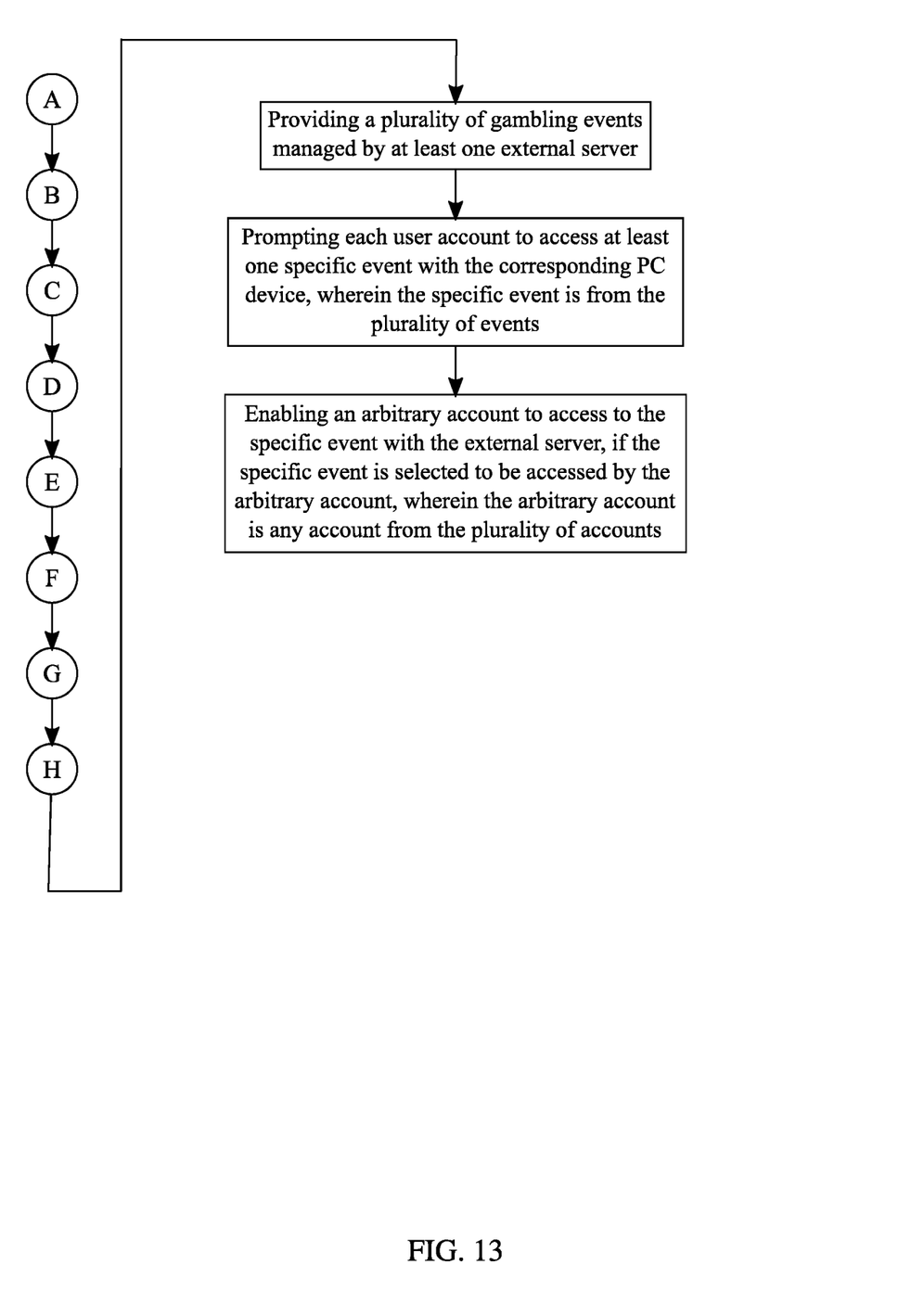
FIG. 13 is a flowchart illustrating the subprocess for booking a wager on a specific gambling event, wherein a plurality of gambling events is externally managed by at least one remote server.

The present invention allows a user account to easily bet with a variety of other outlets as a plurality of gambling events is managed is provided and managed by at least one external server, seen in FIG. 13. In order to be redirected to a different outlet to participate in a desired gambling event, each user account is prompted to access at least one specific event with the corresponding PC device, wherein the specific event is from the plurality of events. The plurality of events is preferably a list of website links that redirect the user account to the gambling event. In order to participate in a specific event, an arbitrary account is enabled to access the specific event with the external server, if the specific event is selected to be accessed by the arbitrary account, wherein the arbitrary account is any account from the plurality of accounts.

Although the invention has been explained in relation to its preferred embodiment, it is to be understood that many other possible modifications and variations can be made without departing from the spirit and scope of the invention as hereinafter claimed.

What is claimed is:

1. A method of statistically comparing sports-entities, the method comprises the steps of:
   (A) providing a plurality of user accounts managed by at least one remote server, wherein each user account is associated to a corresponding personal computing (PC) device;
   (B) providing at least one real-time sport database managed by the remote server, wherein the real-time sport database includes a plurality of sports-entity profiles, and wherein each sports-entity profile includes identification information, performance-related data, and an overall performance rating;
   (C) prompting each user account to enter a sports-entity search query with the corresponding PC device;
   (D) relaying the sports-entity search query from the corresponding PC device of an active account to the remote server, if the sports-entity search query is entered by the active account, wherein the active account is from the plurality of user accounts;
   (E) comparing the sports-entity search query to the identification information of each sports-entity profile with the remote server in order to identify a matching profile from the plurality of sports-entity profiles;
   (F) executing a plurality of iterations for steps (C) through (E), wherein a plurality of matching profiles is identified for the active account during each iteration for steps (C) through (E), and wherein the plurality of matching profiles is from the plurality of sports-entity profiles;
   (G) compiling the identification information, the performance-related data, and the overall performance rating of each matching profile into a graphical comparison with the remote server; and,
   (H) outputting the graphical comparison with the corresponding PC device of the active account.

2. The method of statistically comparing sports-entities, the method as claimed in claim 1, wherein the performance-related data includes fantasy-sports-related data and real-sports-related data.

3. The method of statistically comparing sports-entities, the method as claimed in claim 1, wherein the graphical comparison includes at least one graph and at least one comprehensive report.

4. The method of statistically comparing sports-entities, the method as claimed in claim 1 comprises the steps of:
   providing a graphically interfacing search bar managed by the remote server;
   executing step (C) by displaying the graphically interfacing search bar with the corresponding PC device; and,
   displaying each matching profile within the graphically interfacing search bar with the corresponding PC device of the active account during step (F).

5. The method of statistically comparing sports-entities, the method as claimed in claim 1 comprises the step of:

extrapolating the overall performance rating from the performance-related data of each matching profile with the remote server during step (B).

6. The method of statistically comparing sports-entities, the method as claimed in claim 1 comprises the steps of:
providing at least one social-media rating of at least one specific profile, wherein the specific profile is from the plurality of sports-entity profiles;
incrementing the overall performance rating of the specific profile with the remote server, if the social-media rating of the specific profile is a positive rating; and,
decrementing the overall performance rating of the specific profile with the remote server, if the social-media rating of the specific profile is a negative rating.

7. The method of statistically comparing sports-entities, the method as claimed in claim 1 comprises the steps of:
prompting each user account to enter at least one personal rating of at least one specific profile with the corresponding PC device, wherein the specific profile is from the plurality of sports-entity profiles;
relaying the personal rating of the specific profile from the corresponding PC device of an arbitrary account to the remote server, if the personal rating of the specific profile is entered by the arbitrary account, wherein the arbitrary account is any account from the plurality of user accounts;
incrementing the overall performance rating of the specific profile with the remote server, if the personal rating of the specific profile is a positive rating; and,
decrementing the overall performance rating of the specific profile with the remote server, if the personal rating of the specific profile is a negative rating.

8. The method of statistically comparing sports-entities, the method as claimed in claim 1 comprises the step of:
color-coding the graphical comparison in accordance to each matching profile with the remote server during step (G).

9. The method of statistically comparing sports-entities, the method as claimed in claim 1 comprises the steps of:
providing a plurality of social-media feeds managed by at least one external server, wherein each sports-entity profile is associated to a corresponding feed from the plurality of social-media feeds;
prompting each user account to access the corresponding feed of at least one specific profile with the corresponding PC device, wherein the specific profile is from the plurality of sports-entity profiles;
relaying the corresponding feed of the specific profile from the external server, through the remote server, and to the corresponding PC device of an arbitrary account, if the corresponding feed of the specific profile is selected to be accessed by the arbitrary account, wherein the arbitrary account is any account from the plurality of user accounts; and,
outputting the corresponding feed of the specific profile with the corresponding PC device of the arbitrary account.

10. The method of statistically comparing sports-entities, the method as claimed in claim 1 comprises the steps of:
providing a plurality of sporting-event groupings managed by the remote server, wherein each sporting-event grouping is associated with a plurality of corresponding profiles from the plurality of sports-entity profiles;
prompting each user account to view the corresponding profiles of at least one specific grouping with the corresponding PC device, wherein the specific grouping is from the plurality of sporting-event groupings; and,
outputting the overall performance rating of each corresponding profile of the specific grouping with the corresponding PC device of an arbitrary account, if the corresponding profiles of the specific grouping is selected to be viewed by the arbitrary account, wherein the arbitrary account is any account from the plurality of user accounts.

11. The method of statistically comparing sports-entities, the method as claimed in claim 1 comprises the steps of:
providing a messaging platform managed by the remote server; and,
enabling communication amongst the plurality of user accounts with the messaging platform.

12. The method of statistically comparing sports-entities, the method as claimed in claim 1 comprises the steps of:
providing a plurality of gambling events managed by the remote server;
prompting each user account to place a wager on at least one specific event with the corresponding PC device, wherein the specific event is from the plurality of events;
booking the wager on the specific event by at least one arbitrary account with the remote server, if the wager on the specific event is selected to be placed by the arbitrary account, wherein the arbitrary account is any account from the plurality of accounts;
financially depositing a winning amount into the arbitrary account with the remote server, if the specific event is won by the arbitrary account, wherein the winning amount is proportionate to the wager of the arbitrary account; and,
financially withdrawing a losing amount from the arbitrary account with the remote server, if the specific event is lost by the arbitrary account, wherein the losing amount is proportionate to the wager of the arbitrary account.

13. The method of statistically comparing sports-entities, the method as claimed in claim 1 comprises the steps of:
providing a plurality of gambling events managed by at least one external server;
prompting each user account to access at least one specific event with the corresponding PC device, wherein the specific event is from the plurality of events; and,
enabling an arbitrary account to access to the specific event with the external server, if the specific event is selected to be accessed by the arbitrary account, wherein the arbitrary account is any account from the plurality of accounts.

* * * * *